United States Patent [19]

Elliott

[11] 4,367,545
[45] * Jan. 4, 1983

[54] VIDEO DISC PLAYER

[75] Inventor: James E. Elliott, San Pedro, Calif.

[73] Assignee: Discovision Associates, Costa Mesa, Calif.

[ * ] Notice: The portion of the term of this patent subsequent to Feb. 24, 1998, has been disclaimed.

[21] Appl. No.: 194,637

[22] Filed: Oct. 6, 1980

Related U.S. Application Data

[60] Continuation of Ser. No. 12,626, Feb. 16, 1979, Pat. No. 4,252,327, which is a division of Ser. No. 890,770, Mar. 27, 1978, abandoned.

[51] Int. Cl.³ .............................................. G11B 3/36
[52] U.S. Cl. ................................................... 369/213
[58] Field of Search ................... 346/137; 360/86, 97, 360/99; 369/213, 261, 270, 258, 264, 249

[56] References Cited

U.S. PATENT DOCUMENTS

| | | | |
|---|---|---|---|
| 1,752,059 | 3/1930 | Bristol | 346/137 |
| 2,738,194 | 3/1956 | Foster | 369/213 |
| 3,436,082 | 4/1969 | Bostrom et al. | 369/270 |
| 3,764,758 | 10/1973 | Odagiri | 369/261 |
| 3,867,724 | 2/1975 | Bruer et al. | 346/137 |
| 3,963,863 | 6/1976 | Malissin et al. | 369/44 |
| 4,068,851 | 1/1978 | Yamamura | 369/261 |
| 4,069,503 | 1/1978 | Nagaoka | 369/261 |
| 4,123,780 | 10/1978 | Honjo | 369/213 |
| 4,252,327 | 2/1981 | Elliott et al. | 369/213 |

FOREIGN PATENT DOCUMENTS 583886  1/1925  France ................................ 369/270

Primary Examiner—John W. Shepperd
Attorney, Agent, or Firm—Ronald J. Clark

[57] ABSTRACT

A video disc player assembly is described employing a fixed base member with a pair of fixed rails, and a movable carriage member employing a pair of linear bearing assemblies in engagement with said rails. A capstan and pulley assembly provides a means for moving the carriage member over the rails in the base member. A motor and spindle are mounted on the carriage for rotary driving of the video disc, a centering means is provided to accurately center the disc about the spindle, and a stabilization plate is provided adjacent and parallel to the rotating disc.

4 Claims, 11 Drawing Figures

FIG. 5.
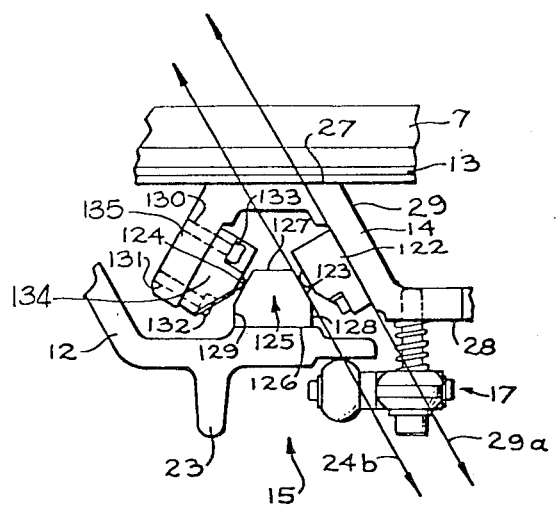
FIG. 6.
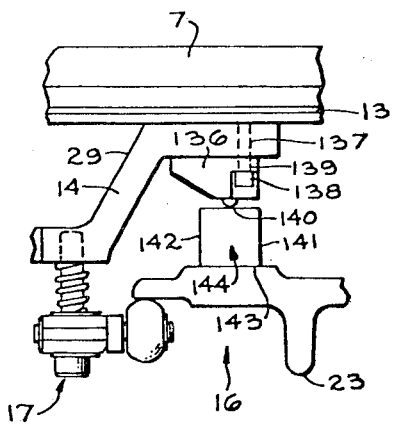
FIG. 7.
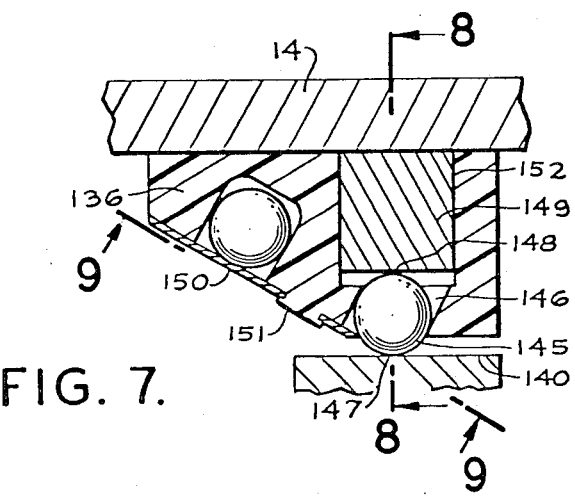
FIG. 10.
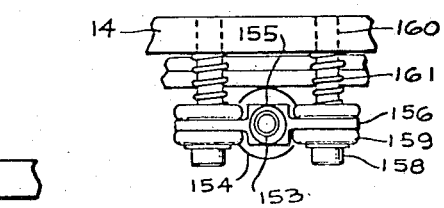
FIG. 11.
FIG. 8.
FIG. 9.
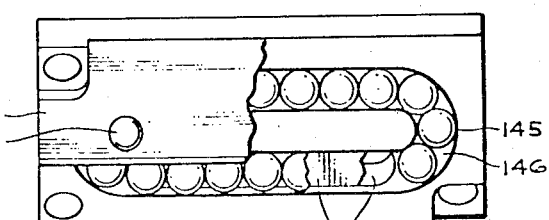

VIDEO DISC PLAYER

This is a continuation of application Ser. No. 12,626, filed Feb. 16, 1979, now U.S. Pat. No. 4,252,327, issued Feb. 24, 1981, which is in turn a division of Ser. No. 890,770, filed Mar. 27, 1978, and now abandoned.

RELATED PATENT APPLICATIONS

Reference is to be had to the patent application entitled VIDEO DISC PLAYER by ludwig Ceshkovsky and Wayne Ray Dakin, Ser. No. 890,670 filed Mar. 27, 1978.

SUMMARY OF THE INVENTION

This is a brief summary of the video disc player unit a function of the video disc player unit is to provide. A support means for the video disc or information carrier. The information carrier is adapted to be rotated about its central axis at a relatively high speed. Disposed upon the information carrier are a series of bumps and lands successively arranged forming an information track. The arrangements of bumps and lands are indicative of a video encoded FM carrier. An alternative embodiment might have an arrangement of bumps and lands indicative of another form of encoding, such as digital encoding. The support means providing restraint for the information carrier is accurately defined with respect to the plane of an objective lens and imparts a critical degree of parallelism to the plane of the objective lens. The objective lens cooperates with a collimated light source and optical elements, such as mirrors and lens, in forming a read beam, and the read beam is utilizable in recovery of information stored on the information carrier by the arrangement of bumps and lands, which arrangement is indicative of a video encoded frequency modulated carrier.

The video disc is mounted for rotation on a carriage, and the carriage is mounted for reciprocal motion with respect to the support means on a locator rail and a support follower rail. The carriage includes a locater bearing assembly and a support follower bearing assembly which engage the locater and follower rails, respectively, and a resiliently mounted rolling retainer is associated with each bearing assembly to maintain engagement between the bearing and rail. The locator rail cooperates with the locator bearing assembly to provide alignment means such that only one rail need be aligned in a plane parallel to a plane defined by the center line of the spindle and extended radially to the center line of the objective lens. The support follower rail provides a working surface for the support follower bearing assembly such that the support follower bearing assembly provides only a means of support without imparting any angular direction which would be in conflict with the alignment prescribed by the locator bearing assembly.

Although the video disc player unit is provided with both a locator bearing assembly and a support follower bearing assembly, alternative embodiments need not be so equipped, for instance a lathe requiring accurate alignment of a particular item of tooling would only require the utilization of the locator bearing assembly and its associated form of support means.

The support means as described herein and coupled with the locator bearing assembly and the support follower bearing assembly cooperate to provide a critical degree of translational accuracy and a frictionless means of accomplishing this translational accuracy.

A stabilization plate is mounted on the carriage, and provides stabilization means to the video disc such that the video disc is isolated from vibrations and compensated for inherent unflatness developed in the disc during manufacture. The stabilization means as employed in the preferred embodiment determines the vertical distance, between the rotating video disc member and the stabilization plate. The vertical distance is accomplished by the restriction of the air exit point located adjacent to the spindle and motor assembly and the stabilization plate.

The increased vertical distance between the video disc member and the stabilization plate provides a higher degree of latitude in video disc specifications. Prior art video discs would contact or scrape the stabilization plate or other components of the video disc player unit. The increased vertical distance thus allows a disc of greater unflatness to be utilized on the preferred embodiment of the video disc player unit.

The carriage assembly employs a clamp assembly providing clamping means to the video disc adapted about its central aperture to be rotated at a high rotational speed. This clamping means cooperates with the spindle assembly and a centering device disposed thereon to firmly retain the video disc member about its central aperture upon the spindle assembly and allowing a clamping means which provides for a high degree of user convenience. This clamping means or a version thereof would be utilizable in any device wherein a means of firm restraint but allowing a high degree of user convenience would be required.

The carriage assembly also employs a centering device which cooperates with the clamp assembly and provide centering means to compensate for variations in the radial size of the central aperture of the video disc member.

FIG. 5 is an enlarged, fragmentary, elevational view of the locator bearing assembly indicated in FIG. 1;

FIG. 6 is an enlarged, fragmentary elevational view of the support follower bearing assembly indicated in FIG. 1;

FIG. 7 is a further enlarged, partly sectional view of the support follower bearing as it appears in FIG. 6.

FIG. 8 is a partly sectional view taken generally along the line 8—8 of FIG. 7;

FIG. 9 is an elevational view with the linear bearing partly broken away taken on the line 9—9 of FIG. 7;

FIG. 10 is a fragmentary bottom plan view of the spring loaded rolling retainer; and FIG. 11 is a fragmentary elevational view of the loaded rolling retainer.

DESCRIPTION OF THE PREFERRED EMBODIMENT

Figure 1:
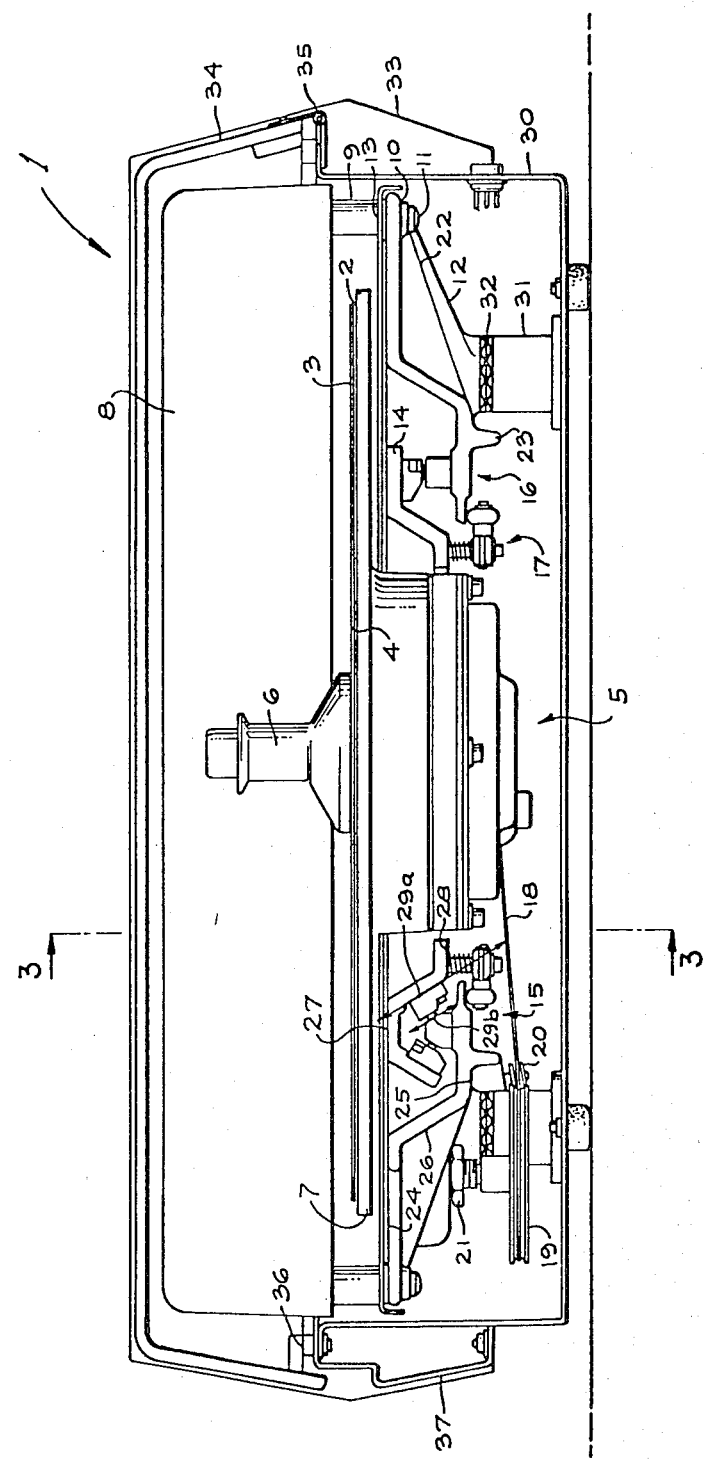
FIG. 1 is an elevational view with a portion of the external housing removed to illustrate the video disc player unit.

Referring to FIG. 1, which is a diagram of a video disc player unit 1, utilizeable in the playback of an information carrier 2, adapted to be rotated about its center at a relatively high speed. The information carrier is a substantially planar substrate having a first surface 3 and a second surface 4 and provided with a central aperture (not shown). Disposed between the first surface 3 and the second surface 4 are a series of bumps and lands, the bumps being primarily light defracting and the land areas being primarily light reflective. The alternately defracting and reflecting bumps and lands are indicative of a modulated FM carrier, the bumps and lands being arranged in such a manner as to form a spiral having a predetermined pitch. The information carrier 2 will henceforth be referred to as a video disc for ease of description.

The video disc player unit 1 comprises a spindle and motor assembly 5 for imparting rotation to the video disc 2 about its central axis and provided with a clamp assembly 6 for retaining said video disc 2 about the central axis of the spindle and motor assembly 5 and parallel to a stationary platform henceforth referred to as a stabilization plate 7.

The video disc player unit 1 includes a means of accurately translating the spindle and motor assembly 5 and the attached video disc 2 radially beneath an optical bridge 8 provided with a light source and optical path (not shown). The position of the optical bridge 8 is maintained vertically above the rotating video disc 2 by means of a number of optical bridge support posts 9 and firmly restrained at point of contact 10 by means of a threaded device 11, such as a screw, which screw is maintained in a threaded aperture located in the optical bridge support post 9 which aperture is not shown in FIG. 1, to the carriage support plate 12. The optical bridge support post 9 passing vertically through an upper plate 13 henceforth known as a protective dust shield, and provided with an aperture (not shown) allowing the translation of the spindle and motor assembly 5 and attached disc 2 throughout their range of linear translation.

The accurate translation of the spindle and motor assembly 5 and the attached video disc 2, radially with respect to the video disc 2 beneath the optical bridge 8, is provided by a carriage 14 having a locator bearing assembly 15 and a support follower bearing assembly 16 allowing an accurate linear translation of the spindle and motor assembly 5 and the attached video disc 2, and a restraining force is supplied by a resiliently attached rolling retainer 17. The means of resilient attachment is accomplished by a number of springs and grommets which will be discussed in detail in FIG. 11. Said resiliently attached rolling retainer 17 supply a downward force to the locator bearing assembly 15 and the support following bearing assembly 16.

The translational motion imparted to the carriage 14 is supplied by a carriage driven capstan (not shown), and directed to the carriage 14 by means of a carriage drive cable 18. The carriage drive cable 18 is directed circumferentially about a carriage drive pulley 19 by means of a carriage drive cable guide 20. The carriage drive pulley 19 supplies a carriage position potentiometer 21 with a motive force directly relatable to the location of the carriage 14. The carriage position potentiometer renders a direct current voltage proportional to the position of the carriage 14 at any given moment.

The carriage support plate 12 is supplied with a number of structural support ribs 22 utilized to strengthen the carriage support plate 12, the carriage support plate 12 also having stiffening ribs 23 located in the area of the locator bearing assembly 15, and the support follower bearing assembly 16 where structural integrity has the highest degree of significance.

The carriage support plate 12 having an upper plane 24 and a lower plane 25 securely conjoined by means of a connecting angle 26 which cooperates with the upper plane 27 of the carriage 14, and the lower plane 28 of the carriage 14 which are interconnected by means of a connecting angle 29 to form a more compact video disc player unit 1. Also indicated by FIG. 1 at the arrows 29A and 29B are two substantially parallel surfaces, which surfaces cooperate to maintain the points of contact of the linear bearing which will be described in detail in FIG. 5.

The carriage support plate 12 forms a secure attachment to the base 30 by means of a carriage support post 31 through a shock mounting dead rubber grommet 32, and is restrained by a threaded device, such as a stud, (not shown). The carriage support plate 12 cooperates with the carriage support post 31 to form a rigid support for the carriage.

In order to contain the rotating disc 2 and the collimated light source (not shown), to the area of the video disc player unit 1, the unit is supplied with two side covers 33 and a cover 34 which is firmly attached through a hinge 35 allowing access to the mechanical portion of the video disc player unit 1. The cover 34 is supplied with a mechanical stop 36 which attaches to the front cover 37 of the video disc player unit 1.

Figure 2:
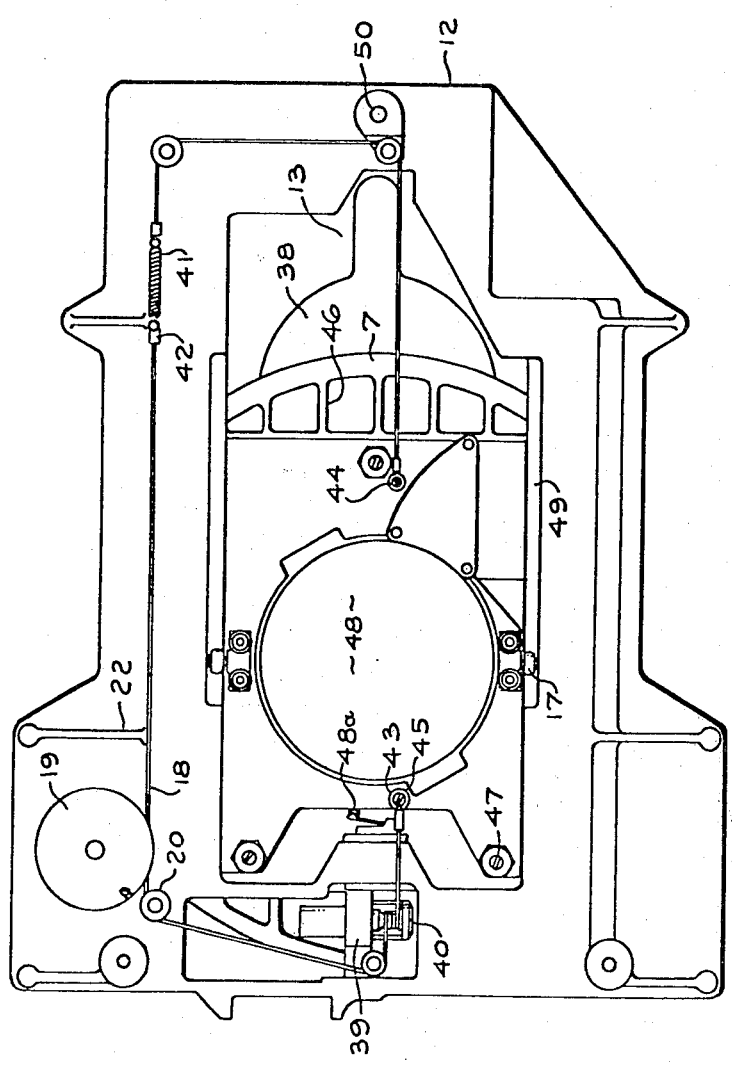
FIG. 2 is a bottom plan view of the carriage and the carriage support plate.

Now referring to FIG. 2 which indicates a bottom plan view of the carriage support plate 12, and the carriage 14, and their relationship.

FIG. 2 shows the protective dust cover 13 and its aperture 38 allowing for the translation of the carriage 14 throughout its range of travel.

The translation of the carriage 14 is achieved by means of the carriage drive capstan 39 at which point, the carriage drive cable 18 is wound circumferentially about the carriage drive capstan shaft 40. The path of the carriage drive cable 18 is prescribed by a number of carriage drive cable guides 20.

It can be seen, by a person skilled in the art, that as the carriage drive capstan 39 and its associated carriage drive capstan shaft 40 are rotated, the carriage drive cable 18 will be wound or unwound circumferentially about the carriage drive capstan shaft 40. In a direct relationship with the direction of rotation of the carriage drive capstan shaft 40, thus imparting a motive force to the carriage 14 through the carriage drive cable 18 and its associated points of attachment 43 and 44 to the carriage 14. The cooperation of carriage drive capstan 39, the carriage drive cable 18 and the carriage drive cable guides 20, form the carriage drive, utilizeable as means of imparting linear motion to the carriage.

The carriage drive cable 18 having a device 41, such as a spring, which device supplies tension and dampening to said carriage drive cable 18, and having attachment to said carriage drive 18 at the point 42. The carriage drive cable 18 having a means of attachment to the carriage 14 at the points of attachment 43 and 44, said points of attachment 43 and 44 being accomplished by the means of a threaded device 45, such as a screw. The threaded device 45 is restrained in its posiiton by means of a threaded aperture (not shown).

Continuing with FIG. 2, it can be seen that the stabilization plate 7 is supplied with a number of structural ribs 46 greatly enhancing the structural integrity without appreciably increasing the mass of said stabilization plate 7. The stabilization plate 7 is rigidly attached to the carriage 14 by means of a number of adjustable retaining screws 47. Due to this rigid attachment, the stabilization plate 7 is directed to move in conjunction with the carriage 14. The maintaining of a low mass stabilization plate allows for faster forward and reverse speeds that might be utilized in a reject or search mode. The low mass carriage and stabilization plate assembly allow for the use of a lower energy capstan drive for said carriage drive, since the low mass assembly is incapable of storing as much inertia as an assembly utilizing a solid stabilization plate.

The advantages of utilizing a belt type drive system having a capstan drive forming, the motive force are such that the capstan drive allows for precise servo control of the carriage 14 speed. This system also eliminates problems with oscillations and irregularities in carriage speed due to the cooperation of the capstan and dampening spring in isolating said carriage 14 from these forms of irregularities.

It can be seen from FIG. 2 that the carriage 14 is supplied with an aperture 48 which provides a placement point for the spindle and motor assembly 5. This aperture 48 cooperates with the dual planes 27 and 28 of the carriage 14 and the dual planes 24 and 25 of the carriage support plate 12 to provide a means of lowering vertically the spindle and motor assembly which is the limiting factor in reducing the vertical size of the video disc player unit 1. The cooperation of the carriage 14, the stabilization plate 7 and the spindle and motor assembly 5 form the carriage assembly, utilizeable in the support, rotation and translation of the video disc 2.

Continuing with FIG. 2, it can be seen that the resiliently mounted rolling retainer 17 is provided with a groove 49 allowing for a predetermined area of travel.

Also visible in FIG. 2 is a threaded aperture 50 which provides a restraining point for a threaded device such as a stud (not shown).

Figure 3:
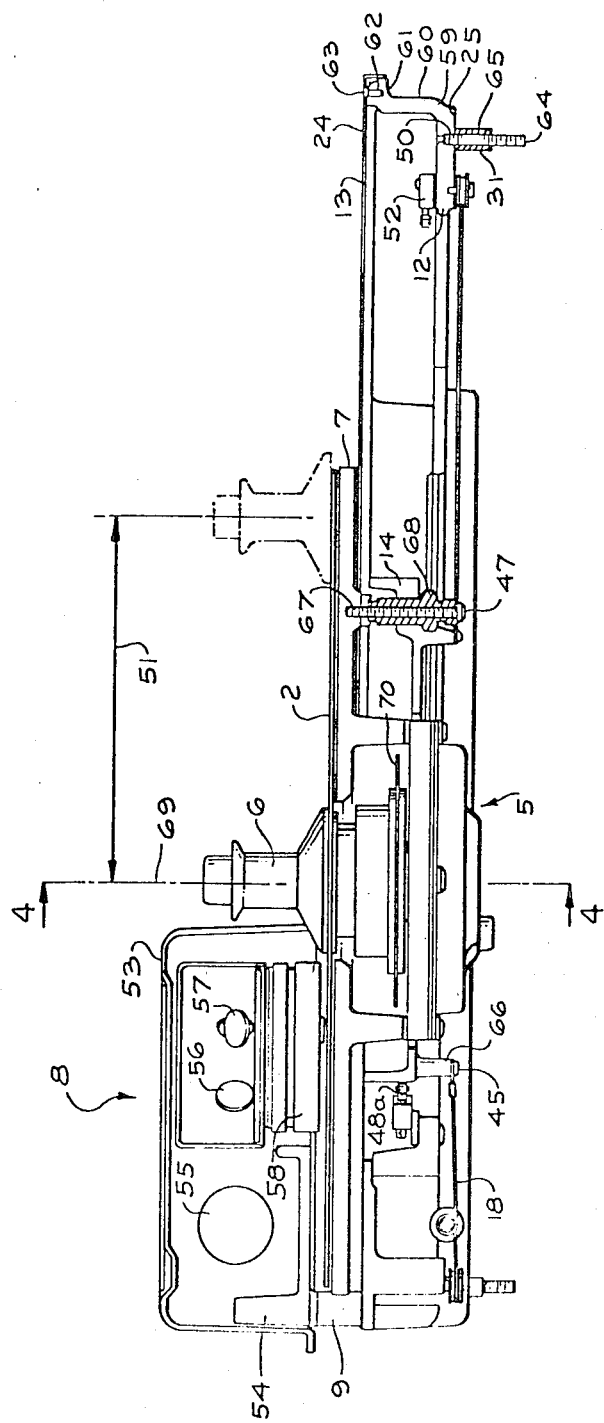
FIG. 3 is an elevational view of the basic mechanical portion of the video disc player unit taken generally along the line 1—1 of FIG. 1.

Also shown in FIG. 2 is a limit switch 48a which will be further discussed in FIG. 3.

Now referring to FIG. 3, indicated by the arrow 51 is the range of travel allowed the carrriage 14. This travel is mechanically limited by the limit switch 48a and a limit switch 52, these limit switches 48a and 52 collectively operate to define the furthermost boundaries of the carriage travel, and provide a positive means of safeguarding the video disc player unit 1 from unnecessary damage due to operator error or a mechanical malfunction.

Continuing with FIG. 3, it can be seen that the optical bridge 18 is provided with an optical bridge shield 53 which optical bridge shield 53 fully encloses the optical bridge 8, this is provided for safety reasons as the collimated light source 55, such as a laser, is required to have such shielding to eliminate the occurrence of preventable injuries to the user.

The optical bridge 8 is formed by the optical bridge base 54 and attachment of the associate optical bridge components such as mirrors 56 and 57 which direct the collimated light reflected from the surface 3 of the video disc 2 in order to recover information stored thereon.

The optical bridge 8 is also provided with a lens driver assembly 58 which lens driver assembly focuses the read beam generated by the collimated light source 55 such that the read beam is maintained in critical focus on the bumps and lands disposed upon the video disc 2 and in a manner such that the lens driver assembly will maintain said critical focus throughout any vertical excursions the video disc may undergo due to its own imperfections.

Continuing with FIG. 3, it can be seen at the lower plane 25 of the carriage support plate 12 forms a bend 59 thus directing the carriage support plate 12 vertically to form an upright 60. Said upright 60 directing the carriage support plate 12 towards its upper plane 24 via an elbow 61. Disposed upon the upper plane 24 of the carriage support plate 12 is a threaded aperture 62 which cooperates with a threaded device 63, such as a screw, to restrain the protective dust shield 13 in its required position.

Still referring to FIG. 3, it can be seen that the threaded aperture 50 cooperates with a threaded device 64, such as a stud, and passing through an aperture 65 provided in the carriage support plate post 31 to form the restraining member of the carriage support plate post 31.

Continuing with FIG. 3, it can be seen that the stabilization plate 7 is provided with a number of threaded apertures 67 which apertures 67 cooperate with a number of adjustable retaining screws 47 to provide an adjustable means of restraint such that the stabilization plate conforms to a crtical prependicularity to the central axis 69 of the spindle and motor assembly 5 and having a number of threaded locking means 68, such as nuts, which nuts cooperate with the adjustable retaining screws 47 to insure said critical perpendicularity to the central axis of the spindle and motor assembly 5.

Still referring to FIG. 3, it can be seen that a tachometer disc 70 which tachometer disc 70 is shown securely attached to the spindle and motor assembly 5. Said tachometer disc 70 is utilizeable in generating an electrical signal indicative of the spindle speed at any given moment. Said electrical signal providing an accurate representation to servo means such that the servo means will maintain the spindle speed within a critical limit of a desired speed of rotation.

Figure 4:
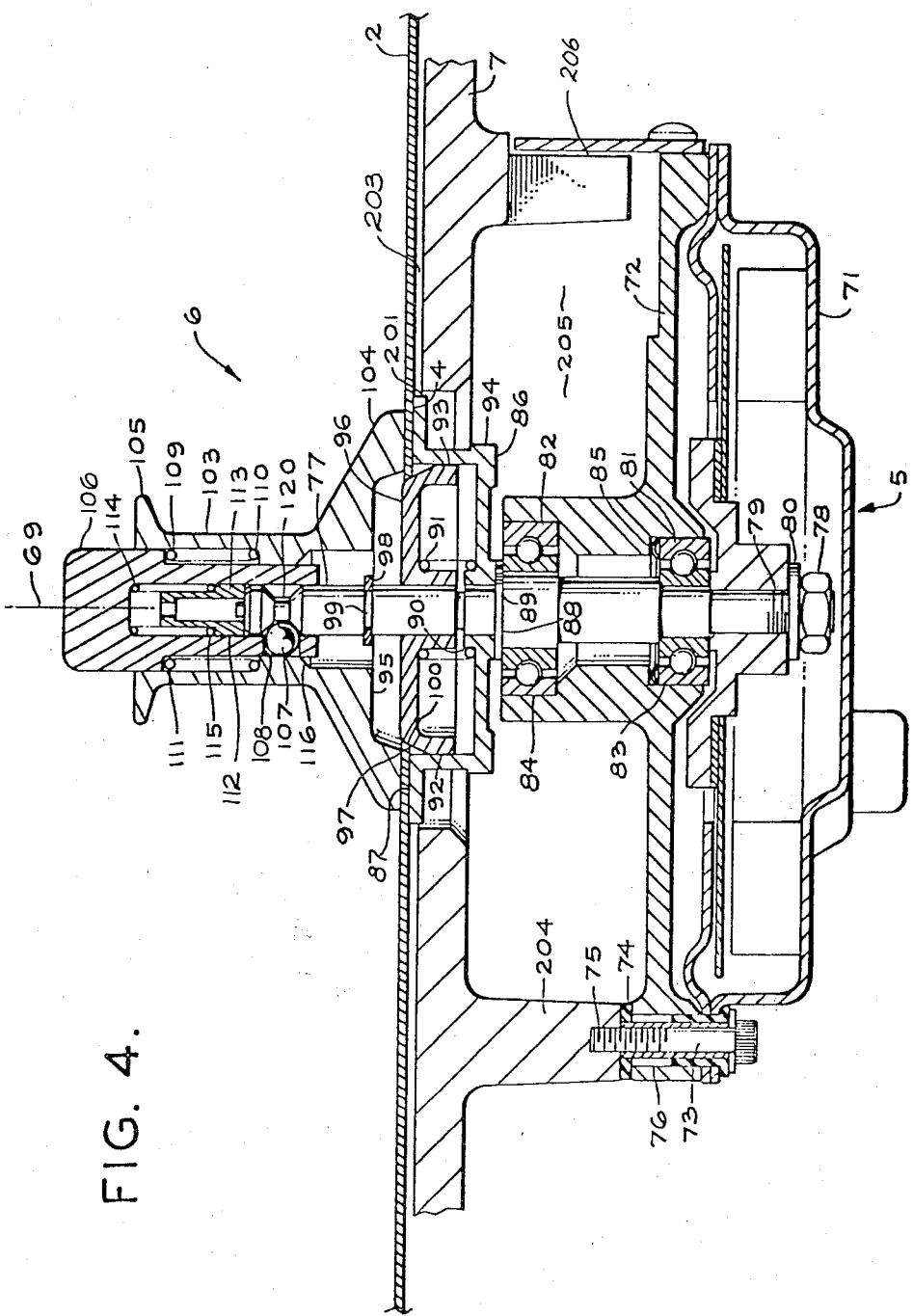
FIG. 4 is an enlarged elevational view partly in section of the spindle and motor assembly taken generally along the line 3—3 of FIG. 3.

Now referring to FIG. 4, a detailed diagram of the spindle and motor assembly 5, the clamp assembly 6 and the stabilization plate 7 is provided.

FIG. 4 shows a motor 71 which motor is utilizable for imparting a rotational motion to a video disc 2. Said motor retained in its location by means of a threaded device 73, such as a screw, which screw cooperates with a threaded aperture 75 and passes through an aperture 76 provided in a motor mount 72. Said motor mount 72 is vibrationally isolated from the remainder of the spindle assembly by means of a dead rubber mount 74. Said motor 71 is a pancake type and is commercially available.

The spindle 77 is securely connected to the motor 71 by means of a threaded device 78, such as a nut, which nut cooperates with a threaded lower portion 79 of the spindle 77, said threaded lower portion 79 passing through an apertured spacer 80, such as a washer.

The spindle 77 is provided with a means accurately locating said spindle about its central axis 69, said means also providing a high degree of nearly frictionless rotation. This is accomplished by the implementation of the lower bearing 81 and the upper bearing 82. The lower bearing 81 is retained by a means, such as a press fit, in a recess 83. The upper bearing 82 is also retained by a means, such as a press fit, in a recess 84. The lower bearing 81 is further provided with a thrust washer 85, said thrust washer 85 limiting the amount of vertical motion of the spindle 77.

Continuing with FIG. 4, the spindle 77 is provided with a video disc support ring 86 which video disc support ring is arranged about the central axis 69 of the spindle 77 and having an upper plane 87 arranged in a critical perpendicularity to the central axis 69 and directly adjacent to the plane of the second surface 4 of the video disc 2. Said video disc support ring 86 having a lower plane 88 in intimate contact with an upper plane 89 of the upper bearing 82, and provided with a lip 90 for the positioning of a compression spring 91.

Still looking at FIG. 4, it can be seen that the spindle 77 is providing with a centering device 92 which centering device is arranged in critical perpendicularity to the central axis 69 of the spindle 77. Said centering device 92 being of a substantially conical shape and residing in a recess 93 formed by the vertical connection upright 94 of the video disc support ring 86. Said centering device having a first position 95 and a second position 96. The centering device 92 cooperates with the central aperture 97 of the video disc 2 and the clamp assembly 6 in providing an accurate means of locating said video disc 2 about the central axis 69 of the spindle 77.

In order to place a video disc 2 on a video disc player unit 1 the clamp assembly is removed from the spindle 77, this will be described in detail further on. The video disc 2 is placed on the spindle and motor assembly 5 such that the second surface 4 of the video disc 2 contacts the upper plane 87 of the video disc support ring 86. The central aperture 97 of the video disc 2 contacts the centering device 92 at a point 100. The centering device 92 at this point is residing in its first position 95. Said first position being described as the centering devices upper vertical limit of travel as defined by a retaining device 98, such as a snap ring, as it resides in a groove 99 about the central axis 69 of the spindle 77. The centering device 92 receives an upward pressure from the compression spring 91 which maintains it vertically against the retaining device 98. The cooperation between the conical shape of the centering device 92 and the upward pressure of the compression spring 91 allow a wide variation in radial size of the central aperture 97 of the video disc 2, without substantially degrading the centering device's ability to accurately locate the video disc 2 about the central axis 69 of the spindle 77. As the clamp assembly 6 is replaced on the spindle 77 the clamp assembly 6 engages the video disc 2, and with the clamp assembly in its restrained position the video disc 2 is firmly held between the video disc support ring 86 and the clamp assembly 6, pressure provided to the centering device 92 by the compression spring 91, allowing the video disc 2 to rest at a point of contact on the conical surface of the centering device 92 individually defined by the radial size of the central aperture 97 of the video disc 2.

Continuing with FIG. 4, the clamp assembly 6 will now be described in detail. The clamp assembly 6 is provided with a main clamping portion 103 being primarily cylindrical in shape and having a conical base 104 and provided with a flange 105 disposed upon its uppermost region. The main clamping portion 103 provides the restraint for the video disc 2 when cooperating with the video disc support ring 86 and the centering device 92. The remainder of the clamp assembly 6 is provided to allow ease of operation yet insuring a secure restraint of both the clamp assembly 6 and the video disc 2. The clamp assembly 6 is provided with a release button 106 which is utilizable in the removal of the clamp assembly 6 from the spindle 77. The release button 106 is provided with a lip 109 and the main clamping portion 103 is provided with a ledge 110, said lip 109 and said ledge 110 cooperate to form a cylindrical recess wherein resides a compression spring 111, said compression spring 111 retaining the release button 106 its upper most limit of travel. The release button 106 is provided with a threaded aperture arranged about the central axis 69 of the spindle 77 and not shown in FIG. 4. Said threaded aperture in the release button 106 cooperates with a threaded device, such as a screw to form a mechanical stop for a plunger 113 plunger is provided with a compression spring 114, said compression spring residing on a ledge 115 formed on the plunger 113 and supplying a downward force to the plunger.

To secure the clamp assembly 6 to the spindle 77, a number of steel balls 107 are received in an equal number of apertures 108 in the release button 106, and the balls engage an annular groove 120 in the spindle. By this arrangement, and as illustrated in FIG. 4, the release button 106 is secured to the spindle 77, and the main clamping portion 103 of the clamp assembly is urged into clamping engagement with the disc 2 by the compression spring 111.

To remove the clamp assembly 6 from the spindle 77, two fingers are placed under the flange 105, and the release button 106 is depressed with the thumb. This action pulls the main clamping portion 103 upwardly, bringing a widened inside diameter portion 116 of the main portion 103 adjacent the steel balls 107, thereby permitting the balls to move radially outwardly out of the annular groove 120. In this position the clamp assembly 6 can be axially withdrawn from the spindle 77, and as the clamp assembly is so withdrawn, the plunger 113 moves downwardly within the release button 106 until an outer surface 112 of the plunger 113 engages the balls 107 and retains them within the clamp assembly while it is disengaged from the spindle.

Now referring to FIG. 5 which is an enlarged sectional view of the locator bearing assembly, the locator bearing assembly is formed by the cooperation of the lower plane 28, the connection angle 29, the upper plane 27, and a diverging angle 135, and their relative disposition on the carriage 14. The connecting angle 29 and the diverging angle 135 form a truncated assembly to which is attached a linear bearing 122. The bearing 122 has a point of contact to a truncated rail 125 having an upper surface 127 and a lower surface 126 which attaches to the carriage support plate 12 by means of a threaded device not shown in FIG. 5. The truncated rail 125 has two side connecting pieces 128 and 129 and has two working surfaces 123 and 124. The diverging angle 135 has a second linear bearing 134 attached by means of a threaded device 132 cooperating with a threaded aperture 131 and a second threaded device 133, such as a screw, cooperating with a second threaded aperture 130. The locator bearing assembly is maintained in intimate contact with the truncated rail 125 by means of the resiliently mounted rolling retainer 17. The locator bearing assembly provides an accurate means of frictionless translation for the carriage 14 throughout its travel.

Now referring to FIG. 6 which is an enlarged sectional view of the locator follower bearing assembly. The locator follower bearing is arranged upon the carriage 14 by means of a connecting angle 29 cooperating with the upper plane 27 of the carriage 14. Attached to the upper portion of the carriage 14 is a linear bearing 136 restrained in this position by the cooperation of a threaded aperture 137 and a threaded device 138, such as a screw, passing through an aperture 139 in a linear bearing 136. The linear bearing 136 has a point of contact on the working surface of a substantially square rail 144 having a working surface 140, a side connecting surface 141 and a second side connecting surface 142. The support follower rail 144 is restrained in its position through its surface 143 by means of a number of threaded devices, such as screws, not shown in FIG. 6. The support follower bearing supplies support to the carriage 14 directly opposing the locator bearing assembly such that both sides of the carriage 14 are supported equally. The support follower bearing assembly provides the required support without imparting an angular direction to the plane of translation of the carriage as defined by the locator bearing assembly.

It will be appreciated that the linear bearings 122, 134 and 136 are of similar construction, and accordingly, one of these bearings will be described in detail with reference to FIG. 7, which is a cross sectional view through the support follower bearing 136. From this view a number of steel balls 145 are indicated having a point of contact at the point 147 and the point 148. The point 147 forming a contact with the working surface 140 of the support follower rail and a point 148 having a point of contact with the steel shoe 149. The steel ball 145 can be seen residing in a recess 146 henceforth referred to as the oval track. The steel balls 145 are retained within the linear bearing by a cover plate 150, the cover plate 150 being retained by a tab 151.

Now referring to FIG. 8 which shows the steel shoe 149 residing in the slot 152 and having a point of contact with the carriage at the point 153. Indicated at the points 148 are the points of contact with the steel shoe of the balls 145 indicated at the points 147 are the points of contact of the steel balls with the working surface 140 of the support follower rail 144. Indicated at 154 can be seen a radius on the opposite side of the steel shoe 149 from the steel balls 145. This radius allows the linear bearing to be self aligning. This marks one improvement over the normal linear bearings available today, in that this linear bearing is capable of maintaining a critically accurate translation despite irregularities in working surfaces provided for the linear bearing.

Now referring to FIG. 9 showing an elevational view of the linear bearing partially cut away to show the relationship of the parts. Indicated at 145 are the steel balls residing in the oval track 146. The cover 150 has been cut away to show the path of the oval track 146, the tab 151 is still indicated. The steel shoe 149 is indicated in the slot 152.

Now referring to FIG. 10 showing the resiliently mounted rolling retainer from a bottom plan view. A shaft is indicated at the point 153 which retains a roller 154 by means of a retaining device, such as a snap ring. The shaft 153 passes through a truck 156 where it is restrained by a retaining device, such as snap ring 157. A threaded device such as a screw is indicated at 158 and a rubber bushing 159 is retained by the screw 158.

Now referring to FIG. 11 which is an elevational view of the resiliently mounted rolling retainer 17. The roller is indicated at 154 said roller being maintained by the shaft 153 and restrained by the snap ring 155. The truck 156 supplies a mounting platform for the roller and is provided with an aperture not shown, through which a threaded device 158, such as a screw, passes vertically towards the carriage 14 where it cooperates with a threaded aperture 160 to restrain the resiliently mounted rolling retainer 17, the threaded device 158 passes through a spring 161 which spring 161 supplies a downward force to the carriage 14. The spring 161 and the rubber bushing cooperate to provide the resilient attachment of the rolling retainer 17. This resiliently mounted rolling retainer allows for a high degree of restraint and provides for reliable selfalignment of the locator bearing assembly and the support follower bearing assembly without impairing there frictionless translation.

Another novel feature of the present invention resides in a method and means by which the rotating disc 2 is stabilized. More specifically, referring again to FIG. 4, it can be seen that the stabilization plate 7 is provided with an upright 204, this upright 204 is provided with the aperture 75 wherein the threaded device 73 is retained. The upright 204 cooperates with the motor mount 72 forming a cavity 205, the cavity 205 employing an aperture 206 provided for ingress of air to the cavity 205. The cavity serves as a storage means for a volume of air. Which volume of air is provided as a ready supply such that a portion of this volume of air is available at an air exit point 201. The air supplied at the air exit point 201 is employed in a region 203 which is formed by interaction of the stabilization plate 7 and the second surface 4 of the video disc 2. The video disc 2 and the stabilization plate 7 are arranged about the central axis 69 of the spindle 77 and maintain a critical perpendicularity to the central axis 69 of the spindle 77.

The use of a stabilization plate is well known in prior art. However, it has been determined experimentally that the vertical distance between the stabilization plate 7 and the second surface 4 of the video disc 2 is of a critical nature such that the interaction of the stabilization plate 7, and the video disc 2 will cooperate to provide a degree of stability to the video disc 2 not normally inherent in the video disc. It has been determined that a video disc can have a nature such that it is substantially unflat. This unflatness is generated at the time of manufacture of the video disc and is individually variable video disc to video disc. This unflatness is detrimental to the optimum operation of the video disc player unit in that an unflat video disc will scrape or in other ways, contact the surface of the stabilization plate or other components of the video disc player unit when the disc is rotated about the central axis of the spindle. An obvious means of rectifying this problem is to extend vertically the distance between the video disc 2 and the stabilization plate 7. However, it was determined that the cooperation between the stabilization plate and the video disc no longer existed, and the dampening effect provided by the region 203 of air between the lower surface 4 of the video disc 2 and the stabilization plate 7 acted in a manner such that it no longer dampened the oscillations to which the video disc 2 is prone. Through experimentation, the air exit point 201 and its available areas were identified as cooperating with other factors, well known to a person skilled in the art, such that the available area of the air exit point was contributing to this lack of dampening of the oscillations to which the video disc is prone. It was further determined by limiting the available area to a mathematically ascertainable amount that this detrimental effect could be eliminated. The area of the air exit point 201 in the present embodiment is approximately 6 tenths of a square centimeter. This effectively eliminates the problem by allowing an extended vertical distance between the stabilization plate and the video disc such that an unflat video disc no longer scrapes or contacts the stabilization plate or other components in the video disc player unit upon imparting rotation to the video disc.

While the invention has been particularly shown and described with reference to a preferred embodiment and alterations thereto, it would be understood by those skilled in the art that various changes in form and detail may be made therein without departing from the spirit and scope of the invention.

What is claimed is:

1. A videodisc player for retrieving information stored upon a rigid videodisc record, said player comprising:
   a housing including fixed support means;
   a carriage mounted on said fixed support means for generally linear, reciprocal movement with respect to said support means;
   a stabilization plate mounted on said carriage and movable therewith, said plate being formed with an aperture and a flat upper surface;
   means for controlling movement of said carriage with respect to said support means;
   a motor and spindle assembly mounted on said stabilization plate for movement therewith, at least a portion of said assembly extending through said aperture in said stabilization plate;
   said spindle having a central axis and said assembly including means for mounting a videodisc about said spindle in a plane generally perpendicular to the axis of said spindle and parallel to said stabilization plate, said mounting means including a videodisc support ring having a generally flat surface disposed in a plane generally perpendicular to said spindle axis and arranged to abut a first side of said disc, said generally flat surface of said support ring being disposed above and parallel to a surface of said stabilization plate;
   said support ring being positioned within said aperture in said stabilization plate and spaced from said stabilization plate for forming an air channel;
   means for centering said disc about said spindle; and
   releasable clamping means arranged to rigidly engage said spindle and resiliently engage a second side of said disc for holding the disc against said support ring and parallel to said plate.

2. A videodisc player as recited in claim 1, and further including:
   means for adjusting and maintaining said stabilization plate perpendicular to said central axis of said spindle.

3. A videodisc player as recited in claim 1, wherein said stabilization plate further comprises:
   means depending from said plate for forming an air reservoir in combination with said motor and spindle assembly.

4. A videodisc player as recited in claim 3, wherein:
   said depending means includes air intake means.

* * * * *

UNITED STATES PATENT AND TRADEMARK OFFICE
CERTIFICATE OF CORRECTION

PATENT NO. : 4,367,545                Page 1 of 2
DATED      : January 4, 1983
INVENTOR(S) : James E. Elliott and Lawrence S. Canino It is certified that error appears in the above-identified patent and that said Letters Patent are hereby corrected as shown below:

Under "Inventor:" after "James E. Elliott, San Pedro, Calif." add --Lawrence S. Canino, Torrance, Calif.--.

Column 1, line 11, delete "ludwig" and insert --Ludwig--.

Column 1, line 16, after "unit" (first occurrence) insert --.--, and delete "a", and substitute --A--.

Column 1, line 17, after "provide" delete ". A" and insert --a--.

Column 3, line 61, delete "driven" and insert --drive--.

Column 5, line 57, delete "18" and insert --8--.

Column 7, lines 56 and 57, delete "pressure provided to the centering device 92 by the compression spring 91,--.

Column 8, line 17, insert after "113" --. The--.

Column 8, line 21, after "plunger" insert "113".

UNITED STATES PATENT AND TRADEMARK OFFICE
CERTIFICATE OF CORRECTION

PATENT NO. : 4,367,545  Page 2 of 2

DATED : January 4, 1983

INVENTOR(S) : James E. Elliott and Lawrence S. Canino

It is certified that error appears in the above-identified patent and that said Letters Patent are hereby corrected as shown below:

Column 9, line 32, after "and" delete "a" and insert --the--.

Column 9, line 33, after "with" delete "the" and insert --a--.

Signed and Sealed this

Nineteenth Day of March 1985

[SEAL]

Attest:

DONALD J. QUIGG

Attesting Officer

Acting Commissioner of Patents and Trademarks